United States Patent Office 3,448,629
Patented June 10, 1969

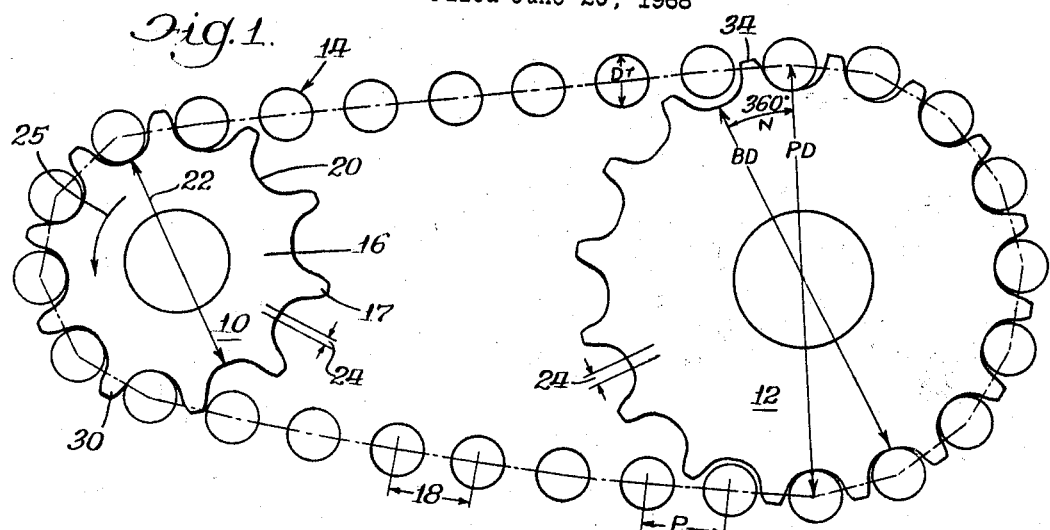
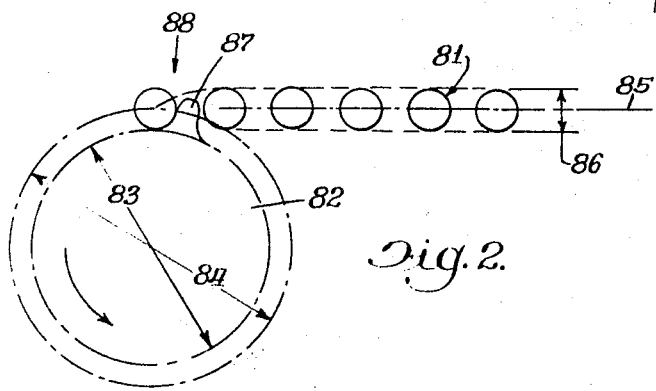
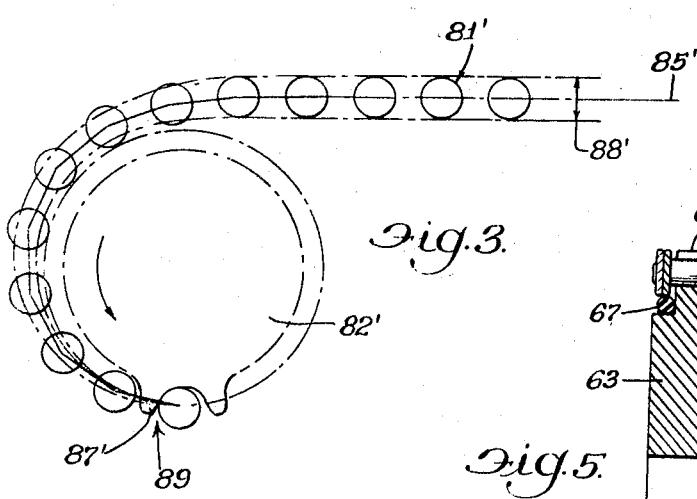
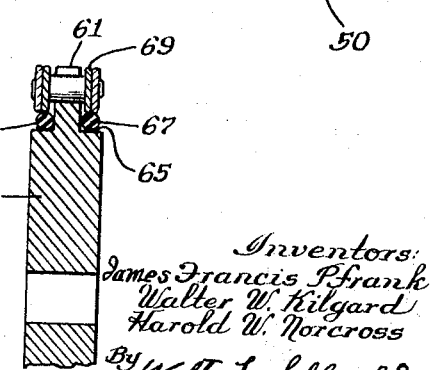
Inventors:
James Francis Pfrank
Walter W. Kilgard
Harold W. Norcross
By Walter J. Schlegel, Jr.
Russell W. Pyle Attys

3,448,629
CHAIN AND SPROCKET DRIVE
James Francis Pfrank, Arlington Heights, Ill., and Walter W. Kilgard, Carmel, and Harold W. Norcross, Indianapolis, Ind., assignors to Amsted Industries Incorporated, Chicago, Ill., a corporation of Delaware
Continuation-in-part of application Ser. No. 611,643, Jan. 25, 1967. This application June 20, 1968, Ser. No. 748,148
Int. Cl. F16h 7/06, 55/30
U.S. Cl. 74—229                9 Claims

ABSTRACT OF THE DISCLOSURE

In a chain and sprocket drive, chain impact is reduced by modifying the bottom diameter of the sprockets from the theoretically correct bottom diameter relative to a given chain, and widening the gap between adjacent teeth of the sprockets sufficiently to allow the modified sprockets to mesh with the chain. In addition, one or more rubber rings are attached near the outer periphery of each sprocket to cushion the impact of the chain.

---

This is a continuation-in-part of copending application Ser. No. 611,643, filed Jan. 25, 1967, relating to a chain and sprocket drive and more particularly to a new and useful method and device for minimizing chain-sprocket impact and hence noise in a chain and sprocket drive.

Most objectionable noise in a chain drive is directly related to the severity of impact between the chain rollers (or bushings in a rollerless chain) and the sprocket that the rollers or bushings engage. Such impact is known to be associated with a radial component as a result of the roller or bushing striking the sprocket at its bottom diameter, and with a tangential component as a result of the sprocket tooth face striking the roller or bushing. The radial component is present with even a toothless sheave.

Accordingly, one object of this invention is to provide a chain and sprocket drive and a method for its design which will minimize noise normally associated with such drives.

Another object of this invention is to provide a method to minimize noise in a chain and sprocket drive by changing the bottom diameter of the sprockets relative to the chain and introducing pitch line clearance into the sprockets.

A further object of this invention is the provision of a chain and sprocket drive wherein the effect of the radial and tangential components of impact are minimized, whereby noise in said drive is reduced.

A still further object of this invention is the provision of an arrangement and design for sprockets which in a combination will cause an engaging chain to tend to follow a semi-involute path in its approach to the sprocket, whereby noise is reduced.

Other objects will become apparent to those skilled in the art from the following specification and appended claims and in connection with the accompanying drawings wherein:

FIGURE 1 is a schematic cross-sectional view of a chain and sprocket drive incorporating the features of the presently described invention;

FIGURE 2 is a fragmentary schematic view of a chain engaging a sprocket in a conventional application;

FIGURE 3 is a fragmentary exaggerated schematic view of a chain engaging a sprocket wherein the principles of the present invention have been utilized;

FIGURE 4 is a fragmentary transverse sectional view of a sprocket having two rows of teeth, showing additional features of the presently described invention; and FIGURE 5 is a similar view of that shown in FIGURE 4 showing a fragmentary portion of a sprocket having one row of teeth.

With reference to the drawings and particularly to FIGURE 1, a chain and sprocket drive is illustrated comprising a continuous or endless roller chain 14 in engagement with a driver sprocket 10 and a driven sprocket 12 spaced from said driver sprocket, said sprockets and chain moving in a direction indicated by arrow 25. It should be understood that while a roller chain has been shown for illustrative purposes, the principles of the invention described herein are applicable to other drives wherein a plurality of spaced engageable members are pivotally connected by links.

Normally, sprockets are designed to accommodate a given or standard chain in such a manner that the chain meshes as closely as possible with the driver and driven sprockets. Hence, in many prior art applications, the pitch of the sprockets approximates the pitch 18 of the chain, with certain allowances and clearances well known to those skilled in the art. The present invention, however, contemplates the deliberate modification between a sprocket and its engaging chain such that the chain tends to follow a semi-involute path in its approach to the sprocket, as will be hereinafter described.

In FIGURE 1, the driver sprocket 10 comprises a rotatable wheel portion 16 having on its outer periphery a plurality of teeth 17 and a plurality of seating curves 20 between adjacent teeth. The present invention contemplates increasing the bottom diameter 22 of driver 10 relative to a chain having a given pitch 18.

According to design principles for conventional chain and sprocket drives:

$$BD = PD - Dr \qquad (I)$$

and $$PD = \frac{P}{\sin \frac{180°}{N}} \qquad (II)$$

where BD (shown on sprocket 12) is the bottom diameter of the sprocket, which may be defined as the diameter of a circle tangent to the seating curves of the sprocket; PD is the pitch diameter, which may be defined as the diameter of the circle theoretically described by the centers of link pins of a chain wrapped on the sprocket; Dr is the roller diameter, or the diameter of each roller of the chain; P is the nominal pitch of the chain; and N is the number of teeth in the sprocket.

Combining Equations I and II:

$$BD = \frac{P}{\sin \frac{180°}{N}} - Dr \qquad (III)$$

Thus, for a chain having a given nominal pitch and a given roller diameter, the theoretically correct bottom diameter of a corresponding sprocket having a given number of teeth is substantially expressed by Equation III, with certain allowances and clearances well known to those skilled in the art. In contradistinction to Equation III, the present invention contemplates increasing the bottom diameter of the driver sprocket 10 over the theoretically correct valve, which creates a mismatch between the chain and the sprocket. In effect, the pitch 18 of the chain will be too short to allow all of the engaging chain to seat in the seating curves 20 of a conventional sprocket.

In order to compensate for the aforementioned mismatch, the driver sprocket 10 is also provided with sufficient pitch line clearance 24 to allow all of the engaging links of the chain to seat in the sprocket. For purposes herein relevant, pitch line clearance may be described as the widening of the gap between adjacent teeth at the bottom of the seating curve of the sprocket by uniformly decreasing the width of the teeth. The amount of pitch line clearance necessary to compensate for bottom diameter modification may be substantially defined as follows:

$$|PLC| = T\left[P - \left(Px\left(\frac{BD_2 + Dr}{BD_1 + Dr}\right)\right)\right] \quad (IV)$$

where PLC is the absolute value of pitch line clearance with the sign indicating whether the bottom diameter was decreased or increased; T is the number of teeth of the sprocket in contact with the chain; P is the nominal pitch of the chain; $BD_1$ is the theoretically correct bottom diameter of a sprocket for a given chain, as defined in Equation III; $BD_2$ is modified bottom diameter as herein described; and $Dr$ is the roller diameter.

The driven sprocket 12 comprises the same parts as the driver sprocket 10 and may be equal or unequal in size to the driver sprocket. Unlike the driver sprocket 10, the bottom diameter of the driven sprocket is reduced from its theoretically correct value relative to a given chain as defined in Equation III. In order to compensate for the mismatch between the chain and sprocket created by this modification, the driven sprocket is also provided with pitch line clearance in accordance with Equation IV.

If the distance between the driver and the driven sprockets is to be fixed before modification is undertaken, the bottom diameter of the driven sprocket 12 must be decreased sufficiently to compensate for the greater chain length requirement caused by increasing the bottom diameter of the driver sprocket 10. The required amount of bottom diameter modification for such fixed distance applications, where the change in the bottom diameter of the driver sprocket or the driven sprocket is known, may be approximated according to the following relationship:

$$\left(\frac{t}{nt}\right) \times (\Delta bd) = \left(\frac{T}{NT}\right) \times (\Delta BD) \quad (V)$$

where $t$ and $T$ are the number of teeth in contact with the chain on the driven and driver sprockets, respectively, $nt$ and $NT$ are the total number of teeth on the driven and driver sprockets, respectively; and $\Delta bd$ and $\Delta BD$ are the changes in bottom diameters of the driven and driver sprockets, respectively, one of which changes is known. Of course, if the distance between sprockets is not fixed, relationship (V) need not apply, since the distance between sprockets may be adjusted to compensate for the increase or decrease of slack in the chain.

Also, in those applications where the distance between sprockets is fixed before modification is undertaken, the pitch line clearance for the sprocket having the greater number of teeth is first determined, in order to further determine whether that sprocket can withstand the resultant reduction of tooth width, and hence, strength in the particular system to be employed. The required modification of the second sprocket may then be determined, since this sprocket normally has fewer teeth in contact with the chain and less tooth strength reduction will be required.

The maximum increase in the bottom diameter of the driver sprocket and the maximum decrease of bottom diameter of the driven sprocket is limited only by the amount of tooth width reduction that can be tolerated in a given application by providing the sprocket with the required amount of pitch line clearance.

The minimum increase in bottom diameter for the driver sprocket is defined by the equation:

$$\Delta BD = \left(\frac{Pc}{\sin\frac{180°}{N}}\right) - Dr - BDs \quad (VI)$$

where BD is the minimum bottom diameter increase; Pc is the actual pitch of the driver sprocket and selected to be larger than the largest pitch of any single link in the chain; N is the number of teeth in the sprocket; Dr is the chain roller diameter; and BDs is the theoretically correct bottom diameter for the nominal chain pitch.

Equation VI can be rearranged to give the minimum decrease in bottom diameter for the driven sprocket as:

$$\Delta BD = BDs - \left(\frac{Pc}{\sin\frac{180°}{N}}\right) - Dr \quad (VII)$$

where Pc is the actual pitch of the undersize sprocket and selected to be smaller than the smallest pitch of any single link in the chain.

The modification of sprockets as herein described causes the point of radial impact between the engageable members of the chain and the seating curves of the sprocket to be moved away from the area where the chordal rise and fall of the chain span is a major contributor to impact severity, whereby radial impact is reduced. Also, the mismatch of pitch between the chain and sprockets (compensated for by cutting the sprockets with pitch line clearance) requires that only one tooth carry the load at one time, whereby the tangential impact is decreased. This feature is shown in FIGURE 1, where tooth 30 of driver sprocket 10 and tooth 34 of the driven sprocket 12 are carrying the majority, if not all, of the load of the drive. Moreover, while the chain and sprocket drive is shown as being driven in a counterclockwise direction (arrow 25 of FIGURE 1), it should be understood that the drive incorporating the invention herein described is reversible.

An additional resultant advantage of the present invention may be seen by comparing the schematic illustrations of FIGURES 2 and 3. FIGURE 2 shows the path of a chain 81 in its approach to a sprocket 82 in a conventional application. Sprocket 82 is schematically illustrated with bottom diameter 83 and pitch diameter 84. Chain 81 follows a path indicated by line 85 and has an amplitude of chordal vibration 86, due to successive contacts between sprocket teeth 87 and the engageable members of the chain. It will be noted that chain 81 follows a substantially circular path around sprocket 82 from the chain entry side 88 and rapidly loses its amplitude of chordal vibration 86 over a short arc. Consequently, the impact force of the chain caused by such vibration on the entry side 88 produces objectional noise.

In contrast to the above, FIGURE 3 shows the exaggerated path of a chain 81' in its approach to a sprocket 82' modified in accordance with the teachings of the present invention. Modification of sprocket 82' causes only tooth 87' on the chain exit side 89 thereof to engage with the engageable members of chain 81', and the chain follows a substantially involute path 85' around the sprocket. Also, the amplitude of chordal vibration 86' is gradually reduced as the chain 81' wraps around sprocket 82' over a relatively long arc, with the consequence that the energy and resulting impact force of the chain is reduced at the area where the chain engages the sprocket, and hence, less noise is produced. The foregoing advantages and theories of operation are intended only as an aid to the understanding of the present invention and are not intended as a limitation on its scope.

An additional feature of this invention is shown in FIGURE 4, which illustrates a sprocket comprising a hub 42 and a main wheel portion 44. The sprocket is cut with a plurality of rows 46 and 48 of aligned teeth, with a recess 50 between adjacent rows of teeth. A ring of resilient or elastic material 52, such as rubber, is placed in each recess 50. A multiple strand chain 54 is also provided comprising a plurality of single strand chains having bushings 56, links 58, and common pins 59. The sprocket and resilient ring 52 are so designed that the links 58 of the chain 54 engage the resilient ring 52 to cushion the chain from the sprocket. This feature is especially advantageous when used with the modified sprockets hereinbefore described. The stiffness and fatigue resistance of the resilient material become much less critical than in a conventional application, due to the reduced radial impact of the modified sprocket.

The above improvement is also shown in conjunction with a sprocket having a single row of teeth in FIGURE 5. In this instance, the teeth 61 of the sprocket are narrower than the main wheel portion 63, thereby defining shoulders 65 on both sides of the teeth. Resilient rings 67 may be mounted on the shoulders 65 such that said rings are engageable with the links 69 of a single strand chain.

Having thus described the invention, what is claimed is:

1. The process of making a chain and sprocket drive wherein an endless chain comprised of a plurality of pivotally connected spaced engageable members interconnects a driver sprocket and a driven sprocket, and wherein each of said sprockets has a plurality of teeth between which are received respective spaced engageable members of the chain, comprising the steps of increasing the bottom diameter of said driver sprocket relative to a given chain and decreasing the bottom diameter of said driven sprocket relative to said chain, and modifying the dimensions of said sprockets such that a plurality of teeth of said sprockets on the chain entry side of said sprockets are entirely spaced from their respective engageable members of the chain.

2. The process according to claim 1 wherein modifying the dimensions of said sprockets relative to a given chain such that a plurality of teeth of said sprockets on the chain entry side of said sprockets are entirely spaced from their respective engageable members of the chain comprises the steps of providing respective sprockets with pitch line clearance between adjacent teeth thereof.

3. A chain and sprocket drive comprising a driver sprocket, a driven sprocket, and a roller chain having a given nominal pitch and roller diameter and interconnecting the sprockets, said driver sprocket having a bottom diameter exceeding standard tolerances and greater than that derived from the formula $$BD = \frac{P}{\sin \frac{180°}{N}} - Dr$$

where BD is the bottom diameter of the respective sprocket, P is the nominal pitch of the chain, N is the number of teeth in the sprocket, Dr is the diameter of a roller of the chain, said driven sprocket having a bottom diameter smaller than that derived from said formula.

4. The invention according to claim 3 wherein said driver and said driven sprockets are provided with pitch line clearance substantially equal to $$T\left[P - P \times \left(\frac{BD_2 + Dr}{BD_1 + Dr}\right)\right]$$

where T is the number of teeth in the respective sprocket in contact with the chain, P is the nominal pitch of the chain, $BD_1$ is the theoretically correct bottom diameter of a sprocket which corresponds to a chain of a given pitch, $BD_2$ is said greater bottom diameter; and Dr is the roller diameter of the chain.

5. The invention according to claim 4 wherein the distance between sprockets is fixed before modification is undertaken and wherein the changes in bottom diameter of the driver and driven sprockets are substantially described by the following relationship:

$$\left(\frac{t}{nt}\right)(\Delta bd) = \left(\frac{T}{NT}\right)(\Delta BD)$$

where $t$ and T are the number of teeth in contact with the chain on the driven and driver sprockets respectively; $nt$ and NT are the total number of teeth on the driven and driver sprockets respectively; $\Delta bd$ and $\Delta BD$ are the changes of the bottom diameters of the driven and driver sprockets respectively.

6. The invention according to claim 4 wherein at least one of said sprockets comprises a plurality of rows of teeth and a recess between said rows; wherein the chain comprises a plurality of strands engaging respective rows of teeth; and wherein said recess is provided with a ring of resilient material engageable with said chain.

7. The invention according to claim 4 wherein at least one of said sprockets comprises one row of teeth narrower than the main wheel portion; wherein a shoulder is formed at the juncture of said teeth and said portion; and wherein said shoulders are each provided with a ring of resilient material engageable with said chain.

8. The method of minimizing noise in a chain and sprocket drive wherein a driver sprocket and a driven sprocket are interconnected by a continuous chain, wherein the driver sprocket is to be provided with an increased bottom diameter with respect to the chain and the driven sprocket is to be provided with a reduced bottom diameter with respect to the chain, and wherein one of said sprockets has a greater number of teeth than the other sprocket, which comprises the following steps in the following order: changing the bottom diameter of said one sprocket and providing that sprocket with pitch line clearance sufficient to mesh with the chain, whereby a determination may be made as to tooth strength reduction; and changing the bottom diameter of said other sprocket and providing said other sprocket with sufficient pitch line clearance to mesh with the chain.

9. A chain and sprocket drive comprising a driver sprocket, a driven sprocket, and a roller chain having a given pitch and roller diameter and interconnecting the sprockets, said driver sprocket having a bottom diameter of at least $$\frac{Pc}{\sin \frac{180°}{N}} - Dr$$

where Pc is the actual pitch of the driver sprocket and selected to be larger than the largest pitch of any single link in the chain; N is the number of teeth in the sprocket; Dr is the chain roller diameter.

References Cited

UNITED STATES PATENTS

| 2,492,219 | 12/1949 | Haefeli | 74—243 |
| 3,194,609 | 7/1965 | Thurlow | 74—229 XR |

FOREIGN PATENTS

| 816,028 | 7/1959 | Great Britain. |

OTHER REFERENCES

German printed application No. 1,040,335, October 1958, Trippe.

FRED C. MATTERN, JR., *Primary Examiner.*

J. A. WONG, *Assistant Examiner.*

U.S. Cl. X.R.

74—243